United States Patent [19]
Jankowski et al.

[11] Patent Number: 6,042,732
[45] Date of Patent: Mar. 28, 2000

[54] STARCH/CATIONIC POLYMER COMBINATIONS AS COAGULANTS FOR THE MINING INDUSTRY

[75] Inventors: Jeffrey A. Jankowski, Naperville; Calvin T. Tobison, Carol Stream, both of Ill.

[73] Assignee: Nalco Chemical Company

[21] Appl. No.: 09/292,461

[22] Filed: Apr. 15, 1999

Related U.S. Application Data

[63] Continuation-in-part of application No. 08/939,249, Sep. 29, 1997, abandoned.

[51] Int. Cl.[7] .................................................. C02F 1/56
[52] U.S. Cl. ............................ 210/727; 44/626; 209/5; 210/728; 210/731; 210/734; 210/735
[58] Field of Search ................... 209/5; 210/725, 210/727, 728, 731, 734, 735; 44/626

[56] References Cited

U.S. PATENT DOCUMENTS

| | | | |
|---|---|---|---|
| Re. 28,807 | 5/1976 | Panzer et al. | 260/2 BP |
| Re. 28,808 | 5/1976 | Panzer et al. | 260/2 BP |
| 2,264,448 | 12/1941 | Möller et al. | 210/731 |
| 2,926,161 | 2/1960 | Butler et al. | 260/89.7 |
| 3,541,009 | 11/1970 | Arendt et al. | 210/730 |
| 3,717,574 | 2/1973 | Werneke | 209/5 |
| 4,253,970 | 3/1981 | Maher | 210/731 |
| 4,370,429 | 1/1983 | Clarke et al. | 524/60 |
| 4,673,511 | 6/1987 | Richardson et al. | 210/734 |
| 4,720,346 | 1/1988 | Flesher et al. | 210/734 |
| 4,801,388 | 1/1989 | Fong et al. | 210/701 |
| 4,835,206 | 5/1989 | Farrar et al. | 524/457 |
| 4,839,060 | 6/1989 | Yong et al. | 210/731 |
| 5,120,797 | 6/1992 | Fong et al. | 525/329.4 |
| 5,178,774 | 1/1993 | Payne et al. | 210/727 |
| 5,296,006 | 3/1994 | Reed et al. | 44/621 |
| 5,330,546 | 7/1994 | Ramesh et al. | 44/620 |
| 5,476,522 | 12/1995 | Kerr et al. | 44/626 |
| 5,518,634 | 5/1996 | Pillai et al. | 210/727 |
| 5,653,886 | 8/1997 | Kerr et al. | 210/727 |

FOREIGN PATENT DOCUMENTS 59-122594  7/1984  Japan .

*Primary Examiner*—Peter A. Hruskoci
*Attorney, Agent, or Firm*—Kelly L. Cummings; Thomas M. Breininger

[57] ABSTRACT

A method for dewatering coal tailings, clean coal products and mineral slurries with an effective coagulating amount of a combination of a cationic polymer and a starch. A preferred cationic polymer is poly(dimethylaminoethylacrylate methyl chloride quaternary salt) and preferred starches are unmodified.

43 Claims, No Drawings

STARCH/CATIONIC POLYMER COMBINATIONS AS COAGULANTS FOR THE MINING INDUSTRY

REFERENCE TO RELATED PATENT

This application is a continuation-in-part of U.S. Ser. No. 08/939,249, filed Sep. 29, 1997, now abandoned.

FIELD OF THE INVENTION

A method for dewatering coal tailings, clean coal products and mineral slurries with an effective coagulating amount of a combination of a cationic polymer and a starch. A preferred cationic polymer is poly(dimethylaminoethylacrylate methyl chloride quaternary salt) and preferred starches are unmodified.

BACKGROUND OF THE INVENTION

Coal is the most abundant natural energy source in the world. A significant portion of the U.S. domestic energy requirements are met by burning coal as a fossil fuel. There are various types of coal found within the U.S., i.e., anthracite, semi-anthracite, low-volatile bituminous coal, medium- and high-volatile bituminous coal, sub-bituminous coal, and lignite. Coals such as anthracite and semi-anthracite typically have high ash and sulfur contents and therefore require beneficiation prior to use.

The primary purpose of coal beneficiation is to reduce the incombustible ash content, thus enhancing the heat content. Reduction in the ash content results in savings in transportation and ash disposal costs. Sulfur, mainly in the form of purite, is also reduced.

Another important economic factor to be considered in coal processing is the recovery and reuse of process water. Water is typically very expensive and there are often limits on total usage. Also, strict environmental controls prohibit or severely limit discharge of process water. Thus, it is imperative that solids be efficiently removed from the process water and water recycled to the process stream.

Beneficiation of coal is effected using two primary properties of coal, i.e., (1) differences in specific gravity between coal and its impurities, and (2) differences in surface characteristics between coal and its impurities. Since the higher ash content fractions are usually found in the finer coal sizes, some plants only screen out these sizes to beneficiate the coal. However, since the quantity of such fine coal is on the rise, even this is treated.

A coal beneficiation plant may be broadly divided into specific gravity separation and fine coal treatment. In gravity separation, cleaning units make use of the differences in specific gravity between coal and its impurities to effect separation. Normally, the specific gravity of the clean coal is less than that of its impurities. Some examples of commonly used equipment for gravity separation are: jigs, heavy medium baths and cyclones, washing tables, water-only cyclones and spirals.

Fine coal treatment incorporates a flotation cell(s), clean coal filter and thickener. In the flotation cell, a collector and frother are added to the flotation feed. A collector such as diesel oil selectively imparts hydrophobicity to the coal particles. This increased hydrophobicity makes the air bubbles more likely to attach to the coal particles. The frother, generally an alcohol-based product, reduces the surface tension of the air/water interface, thus making a stable froth.

The clean coal concentrate from the flotation cells goes to the clean coal filter and is dewatered. The tailings from the flotation cell go to the thickener where they are thickened and discharged.

The thickener is treated with coagulants and flocculants to enhance settling. Typically, the coagulants and flocculants are added at several points along the feed line to the thickener and in different sequences. Coagulation is the destabilization by surface charge neutralization of stable negatively charged particles that are in suspension (i.e., settleable or dispersed) through the utilization of inorganic salts or cationic polyelectrolytes. Flocculation is the aggregation of finely divided particles which are suspended in a liquid through the utilization of an entrapping agent, generally an inorganic flocculant, or a bonding agent, generally an organic flocculant, that brings the particles together.

During the processing of coal, a coal refuse slurry is generated. This slurry consists of residual coal fines and clays suspended in plant process water. Due to the high volume of water used in the processing of coal, it is necessary to reclaim the wash water for recirculation in the plant. The concentrated solids are sent to an impoundment pond for disposal. Generally, the use of anionic flocculants is sufficient to remove the majority of the coal fines; however, when there are high levels of clay in the mined coal, it is necessary to supplement the use of anionic flocculants with the use of cationic coagulants. The sequential addition of flocculants and coagulants is used primarily in the coal refuse thickener and in the subsequent twin belt press filtration of the thickener underflow. The typical application order in the thickener, which is similar to a clarifier, is coagulant addition followed by flocculant addition. This provides a controlled turbidity of the recycle process water and a controlled solids settling rate. In the thickener underflow filtration, the order of application is normally flocculant followed by coagulant. This treatment gives highly agglomerated solids which provides effective dewatering of the waste solids and low turbidity in the recycled process water.

The decrease in sludge volume or the increase in sludge solids results in more efficient use of plant process water and a reduced loading in the impoundment pond. The impoundment pond is the area of the mine where the sludge is used to landfill existing mined surfaces. With time, the sludge further compresses in the impoundment area which provides reclaimed mine sites.

The typical equipment used for sludge thickening and dewatering in the coal industry are Gravity Thickeners, Twin Belt Presses, and Rotary Drum Filters. Each of these pieces of equipment uses flocculants and coagulants. The doses of flocculant and cationic polymers are 5–10 ppm and 1–5 ppm, respectively, for the thickener and 5–20 ppm and 5–30 ppm, respectively, for the filter applications. These polymers are highly surface active and they remain with the solids that are sent to the impoundment pond. These products are used in closed loop coal refuse treatment applications. A treating polymer is also required for the dewatering of other mining underflow solids such as copper ore refuse slurries.

In addition to the treatment of fine coals, dewatering is also necessary in other areas of mineral processing. A variety of mineral slurries such as taconite, trona, sand and gravel slurries and titania require solids removal and dewatering. The same basic processing steps are utilized to extract titanium oxide from titania, for example.

Although some inorganics, principally alum and iron salts, are still used as coagulants, water soluble organic polymers are now more prevalent. Both naturally occurring and synthetic polymers find use as coagulants and flocculants in the mining industry. The principal natural polymers used are starch and guar, both of which are high-molecular weight polymers of simple sugars, such as polysaccharides. Starch is a polymer of glucose consisting of a mixture of linear (amylose) and branched segments (amylopectin).

Synthetic polymers are advantageous because they can be tailored to a specific application. This has resulted in a wide range of commercially available coagulants and flocculants of varying charge, composition, and molecular weight. The most widely used synthetic coagulants are polydiallyldimethylammonium chloride (polyDADMAC) having molecular weights in the range of from 100,000 to as high as 1,000,000 or higher and condensation polymers of dimethylamine and epichlorohydrin (Epi/DMA) which generally have molecular weights in the range of 20,000 to 100,000.

The most widely used synthetic coagulants are polydiallyldimethyl ammonium chloride as described in U.S. Pat. No. 2,926,161 and condensation polymers of dimethylamine and epichlorohydrin such as those described in Reissue U.S. Pat. Nos. 28,807 and 28,808, though co-polymers of 3-acrylamido-3-methylbutanoic acid and acrylamide or acrylic acid are also known, as described in U.S. Pat. No. 5,296,006. These polymers vary greatly in molecular weight, typically ranging from several thousand to as high as 500,000. Condensation polymers are made in solution form, and are available commercially as aqueous solutions containing a relatively low weight percent polymer. Polydiallyldimethyl ammonium chloride is a vinyl addition polymer, which (at the molecular weights used for coagulation) has also been made in solution form. Typical commercially available polydiallyldimethyl ammonium chloride is available in aqueous solutions containing 1–20% by weight polymer.

Copolymers of diallyldimethylammonium chloride and acrylamide having utility for the dewatering of mineral slurries have been described in U.S. Pat. No. 4,673,511. Effective co-polymers consisting of co-polymerizing diallyldimethylammonium chloride (DADMAC) with various other monomers are also known. For example, U.S. Pat. No. 5,330,546 discloses effective co-polymers of DADMAC with a dialkylaminoethylacrylate or a dialkylaminoethylmethacrylate; U.S. Pat. No. 5,476,522 discloses effective copolymers of DADMAC with a vinylalkoxysilane; U.S. Pat. No. 5,653,886 discloses terpolymers formed from polymerization of monomers including DADMAC and U.S. Pat. No. 5,518,634 discloses polymers formed from DADMAC and acrylamide, cross-linked with triallylamine.

Copolymers of DMAEA.MCQ (dimethylaminoethylacrylate methyl chloride quaternary salt) and acrylamide have been described as flocculants in U.S. Pat. No. 4,720,346. Copolymers of DMAE(M).MCQ and DADMAC as treatment materials are described in U.S. Pat. No. 4,835,206.

Dry water soluble polymers such as dry polydiallyldimethyl ammonium chloride have also been used to dewater coal refuse slurries. These polymers have met with some success, dissolving in the refuse thickener over a period of 45 to 60 seconds. Such time is long enough to provide continuous feed of fresh polymer into the coal/clay slurry.

Homopolymers in solution or solid form produced by polymerizing dialkylaminoalkyl(meth) acrylates quaternized by methyl chloride improving the stability of coal dispersions and assisting the separation of coal from mineral matter are described in U.S. Pat. No. 4,370,429. Moreover, dry homopolymers formed from dialkylaminoalkyl(meth) acrylamides as quaternary ammonium salts have been disclosed in U.S. Pat. No. 5,178,774. That reference also teaches that some starch may be utilized as a carrier to promote formation of particles with the cationic polymer. Yet that reference teaches that for best efficiency, starch should not be used, and therefore contradicts the findings described herein.

Starch is described as a dehydrating agent for a coal froth in Kokai No. 59-122594. However, combinations of starch and polymer are not indicated in this reference, and as will be demonstrated by the disclosed examples, the combination of polymer with starch results in an unexpectedly large increase in performance.

Therefore, since there is still a need to achieve better performance, leading to better clarity, reduced consumption of polymer, or simpler operation, the use of polymer/starch combinations as described herein is desirable as they result in improved efficiency of processes in the mining industry.

SUMMARY OF THE INVENTION

A method for dewatering coal tailings, clean coal products and mineral slurries with an effective coagulating amount of a combination of a cationic polymer and a starch. A preferred cationic polymer is poly(dimethylaminoethylacrylate methyl chloride quaternary salt) and preferred starches are unmodified.

DESCRIPTION OF THE INVENTION

One aspect of this invention is a method for dewatering coal tailings containing water, said method comprising the steps of:

a. feeding said coal tailings to a thickener;

b. contacting said coal tailings with an effective coagulating amount of a coagulant comprising a combination of a cationic polymer and a starch;

c. allowing said coal tailings to settle to the bottom of the thickener to obtain concentrated coal tailings;

d. discharging said concentrated tailings from said thickener; and e. withdrawing clarified liquid from said thickener.

The following information is applicable to any aspect of the invention described herein. The method may further comprise the addition of a flocculant. Moreover, the flocculant may be a copolymer of acrylamide and acrylic acid. The thickener may be a gravity sedimentation device. The polymer may be a dry polymer formed from polymerization of one or more monomers selected from the group consisting of dimethylaminoethylacrylate methyl chloride quaternary salt, dimethylaminoethylacrylate benzyl chloride quaternary salt, dimethylaminoethylmethacrylate methyl chloride quaternary salt, dimethylaminoethylmethyacrylate benzyl chloride quaternary salt, diallyldimethylammonium chloride and combinations thereof. Alternatively, the polymer may be a solution polymer formed from polymerization of one or more monomers selected from the group consisting of dimethylaminoethylacrylate methyl chloride quaternary salt, dimethylaminoethylacrylate benzyl chloride quaternary salt, dimethylaminoethylmethacrylate methyl chloride quaternary salt, dimethylaminoethylmethyacrylate benzyl chloride quaternary salt, diallyldimethylammonium chloride and combinations thereof. The polymer may be an epichlorohydrin/dimethylamine polymer or a polyamine formed from reaction of ethylene dichloride and ammonia. The starch may be selected from the group consisting of unmodified starch, pregelatinized starch, hydrolyzed starch and combinations thereof. The polymer/starch combination may be at least 30 weight percent starch. A specific combination is where the polymer is poly (dimethylaminoethylacrylate methyl chloride quaternary salt) and the starch is unmodified starch; wherein the ratio of polymer to starch in said combination is preferably from about 99:1 to about 20:80. More preferably, the ratio of polymer to starch in said combination is from about 70:30 to about 20:80. Most preferably, the ratio of polymer to starch in said combination is from about 60:40 to about 25:75.

Another aspect of the invention is a method for dewatering a clean coal product containing water comprising the steps of:

a. feeding a clean coal product containing water to a mechanical filtering device;

b. contacting said clean coal product with an effective coagulating amount of a coagulant comprising a combination of a cationic polymer and a starch;

c. removing water from said clean coal product; and then, d. recovering a dewatered clean coal product from the mechanical filtering device. For the practice of this invention, the mechanical filtering device may be selected from the group consisting of gravity thickeners, twin belt presses and rotary drum filters.

Yet another aspect of this invention is a method for dewatering mineral slurries containing water comprising the steps of:

a. feeding the mineral slurry into a thickener;

b. treating said mineral slurry with an effective coagulating amount of a coagulant comprising a combination of a cationic polymer and a starch;

c. allowing the water to separate from the mineral slurry;

d. withdrawing water from said thickener; and e. discharging the dewatered mineral products from said thickener.

For the practice of this aspect of the invention, the mineral slurry may be selected from the group consisting of: titania, copper, trona, beryllium and taconite slurries.

Another aspect of this invention is a method for clarifying the water contained in a coal refuse slurry, said method comprising the steps of:

a. treating the coal refuse slurry with an effective coagulating amount of a coagulant comprising a combination of a cationic polymer and a starch;

b. allowing the water to separate from the coal refuse;

c. feeding the separated water and coal refuse into a twin belt filter press;

d. withdrawing the clarified water through the twin belt filter press; and e. removing the coal refuse from the twin belt filter press.

The DMAEA.MCQ and DADMAC polymer solutions can have an intrinsic viscosity of from about 0.2 to about 5 dL/g as determined in 1-M sodium nitrate at 30° C., 1 weight-percent solution. However, low molecular weight polymers are preferred for ease of pumping as a solution and for rate of dissolution when used as a dry product. The DMAEA.MCQ polymers have a preferred intrinsic viscosity of from about 0.1 to about 3.0 dL/g and more preferable from about 0.3 to 1.0 dL/g.

The DMAEA.MCQ polymers can be prepared by conventional means known in the art including latex emulsion, solution, suspension or bulk polymerization techniques. Aqueous solutions of the polymer are preferably prepared as described in Example 1. Concentration of monomer in the reaction mixture will typically range from about 10 to about 40 percent by weight of the reaction mixture to produce the aqueous solution polymer having a polymer actives concentration between 10–40 percent by weight of the solution.

The starch products that are used may be unmodified, physically modified (e.g. pregelatinized), or chemically modified (e.g. cross-linked, substituted, hydrolyzed). However, higher molecular weight, unmodified, low-charge starches are preferred because of the activity they provide. The starch may be dry or in solution.

If the cationic polymer and starch are to be used as solutions they can be made and dosed as a blend or as separate solutions; however, it is preferable to make and dose them as separate solutions. Solution concentrations can be up to about 60% depending on the molecular weight of the cationic polymer and the type of starch used, and the ratio of cationic polymer to starch polymer. For dosage to the system to be treated, the solutions should be diluted to from about 0.01% to about 2% total actives. If made up separately, the starch and cationic polymer solutions can be dosed at the same time or in two or more increments and in different orders of addition. It is preferable to use a split addition of the cationic and starch polymers with the cationic polymer being added first.

If the cationic and starch polymers are to be converted to a dry material for use, the two products may be blended together in a single solution in concentrations from about 10 to about 60% depending on the viscosity as determined by the molecular weight of the polymers, the type of starch used, and the ratio of cationic polymer to starch polymer. The ratio of cationic polymer:starch polymer in the final dry product can preferably range from about 99:1 to about 20:80. A more preferred range of ratios is from about 70:30 to about 20:80 and a most preferred range of ratios is from about 60:40 to about 25:75. The solution may then be dried by conventional means known in the art such as tray drying, spray drying or drum drying. The material must be ground for ease of handling and addition to the system. The particle size can range from about 10 mesh (2.0 mm) to about 400 mesh (38 $\mu$m). A preferable particle size range is from about 18 mesh (1.0 mm) to 200 mesh (125 $\mu$m) with a more preferable range from 40 mesh (425 $\mu$m) to 100 mesh (150 $\mu$m).

The polymers and copolymers of this invention may be used alone, or in combination with a high molecular weight anionic or non-ionic water-soluble or dispersible flocculant. Such polymers include polyacrylamide, and copolymers of acrylamide with acrylic acid and its water-soluble alkali metal or ammonium salts. Also useful are such polymers as sufomethylated acrylamides as exemplified in U.S. Pat. Nos. 5,120,797 and 4,801,388, the disclosures of which are hereinafter incorporated by reference into the specification. Other commercially available anionic flocculant materials may also be utilized.

A preferred class of flocculants for use in this invention includes copolymers of acrylamide and acrylic acid having a mole ratio of acrylamide to acrylic acid of from 99:1 to 1:99 and preferable 99:1 to 50:50. Most preferably, the mole ratio of acrylamide to acrylic acid will be 95:5 to 60:40. An especially preferred flocculant for use in this invention has a mole ratio of acrylamide to acrylic acid of about 70:30.

The flocculants of this invention may be prepared in solution form, or in water-in-oil emulsion form. The preparation of such flocculants is known to those skilled in the art. The flocculants generally have molecular weights ranging from as low as 1,000,000 to 20,000,000 or higher. Preferred flocculants have a molecular weight of about 10,000,000. The upper weight of molecular weight is not critical so long as the polymer is water soluble or dispersible.

The flocculant is believed to cause the aggregation of the neutralized colloidal particles which are suspended in the tailings suspension. Aggregation is the result of either entrapping agents (i.e., inorganic flocculants) or bonding agents (i.e., organic flocculants) bringing the neutralized particles together.

The coagulants and flocculants can be added at several points along the feed line to the thickener and in different sequences. The flocculants may be added either prior to or subsequent to coagulant addition. A typical thickener is a gravity sedimentation unit which is a cylindrical continuous thickener with mechanical sludge raking arms. The tailings (i.e., a solids/liquid dispersion) enter the thickener at the centerwell. The coagulants and/or flocculants are added at points in the feed line and/or centerwell. The number of addition points, sequence, flocculant, coagulant, etc. are determined by laboratory cylinder tests for each particular application. The flocculated solids settle to the bottom of the thickener. The mechanical arms rake the sludge and it is discharged. The clarified water overflows into a launder surrounding the upper part of the thickener.

The cationic polymer/starch blends may be added to the thickener or mechanical filter device at a rate of about 0.001 to about 0.3 lb/ton of slurry, and preferably 0.005 to about 0.25 lb/ton. Most preferably from about 0.01 to 0.25 of polymer is used per ton of slurry. The amount of coagulant will vary according to the particular stream to be dewatered, and whether the coagulant is added as a solution or as a dry material. Flocculant may also be added to the thickener in an effective amount, generally between about 0.01 to about 0.25 lb/ton of slurry.

After treatment of the slurry with sufficient coagulant and optional flocculant, the thickener underflow or refuse (i.e., concentrated tailings) are removed from the bottom of the thickener, while water and/or other liquids are taken out overhead. The water can thereafter be recycled as process water for use in the benefication process or disposed of in impoundment ponds. The concentrated tailings or refuse from the thickener can be thereafter disposed of.

In most instances, adding a given amount of flocculant in two or more increments results in better performance than adding the same amount of flocculant in one increment. It is not unusual to be able to reduce the amount of flocculant required by as much as 30–40% by multi-point addition and still achieve the required settling rate. Multi-point addition may also provide improved clarity (i.e., lower suspended solids) at a given settling rate.

This practice is implemented in a benefication plant process by adding the flocculant at different points in the feed line to the thickener. The improvement results from reducing the amount of surface area that the second or third portion of flocculent actually contacts when added to the system, as well as improved distribution of the flocculent.

The use of combinations of polymer and starch as coagulants also has a broader applicability to the concentration of aqueous suspensions of inorganic solids in general. Among the inorganic solids which may be processed in this manner are gravel, sand and kaolin. The combination may have applicability to the dewatering of natural or other industrial waters.

Additionally, the use of combinations of polymer and starch as described herein may have a positive effect on improvement of retention and drainage in pulp and paper applications.

The following examples are presented to describe preferred embodiments and utilities of the invention and are not meant to limit the invention unless otherwise stated in the claims appended hereto.

EXAMPLE 1

For a lab-scale reaction, a 40% actives aqueous solution of a low molecular weight DMAEA.MCQ polymer was prepared in a 1.5-L batch reactor with a stirrer, thermocouple, reflux condenser, and nitrogen purge. 500 g (50.000 wt %) of DMAEA.MCQ (available from NCF Manufacturing of Riceboro, Ga.) monomer (as an 80% solution in water) were dissolved in 495.25 g of deionized water (49.525 wt %) along with 0.75 g (0.075 wt %) sodium hypophosphite to control the molecular weight of the polymer and mixed in the reactor. The solution was purged with $N_2$ and warmed to 40° C. over 30 minutes. At that time, 4.00 g of a V-50 solution (2,2'-azobisisobutyronitrile available from DuPont Specialty Chemicals, Inc. of Wilmington, Del.) (10% in water), was added to initiate the polymerization. The polymerization began within 3–10 minutes. No attempt was made to cool the reaction. After the reaction reached its maximum temperature, ~78° C., it was held at that temperature for 30 minutes. The reactor was cooled to room temperature and the contents were transferred to a container for evaluation. The product was characterized by measurement of an intrinsic viscosity (IV) (1M $NaNO_3$ solution, 1 wt % polymer solutions), colloidal titration (0.0025 g product against 0.0002 N potassium salt of polyvinyl sulfuric acid (PVSK)), and residual monomer concentration. The polymer samples used for the experiments presented herein were from a 100-gallon direct scale-up of the aforementioned reaction.

For each DMAEA.MCQ:starch ratio to be tested, aqueous solutions containing 40% total actives of the desired blend were prepared by blending the appropriate amount of water and starch into the 40% DMAEA.MCQ solution polymer described above. For testing as a liquid coagulant, the solutions were diluted to 1% total actives and tested. To produce the dry coagulant samples, the 40% solutions were dried in shallow aluminum pans in a 100–105° C. oven for no more than 4 hours. After cooling, the samples were ground in small batches for 15 seconds in a 8-oz. blending container using a standard kitchen blender set to "grind." Dry material that would pass through a 20 mesh screen was collected and used for testing.

Cylinder settling tests using coal refuse slurry were used to quantitate the activity of the coagulant products and their affect on flocculent activity in the same system. A 5-gallon bucket of slurry was allowed to mix while 1-L glass graduated cylinders were filled 500-mL at a time until random sampling was completed. Masking tape was placed on each cylinder, aligned along the cylinder graduation test marks. For each test, a cylinder was inverted several times to suspend any settled solids. The cylinder was then dosed with the coagulant to be tested (solution coagulants were added via syringe, dry coagulants were quantitatively transferred from a plastic weigh boat), and inverted four times. Quickly, the cylinder was then dosed with a 0.1% solution of a flocculant (moderately anionic acrylamide/acrylate copolymer) and inverted four more times. This step was then performed a second time, dosing with the same amount of 0.1% flocculant and inverted four more times—for a total of 3 additions of chemical treatment and 12 inversions. After the last inversion, when the cylinder was returned to the upright position, a timer was started and the position of the solids interface was monitored as a function of time, with marks being made on the masking tape at appropriate intervals. At the point of hindered settling, when the rate of descent of the interface starts to slow down, marking was terminated. The settling rate, in inches/minute, for the free-fall region of settling was calculated for each test. For turbidity measurements, a 20-cc sample of water above the settled solids was taken from the top portion of the cylinder 3 minutes after timing for the settling rate was initiated. Turbidity readings in NTUs were obtained using a Hach 2100P Turbidimeter. A decrease in NTU value indicates an increase in efficiency for this application.

The results in Table I illustrate the superior performance of a dry coagulant over that of a solution coagulant of the same actives composition. For dry DMAEA.MCQ and dry DMAEA.MCQ/starch (pregelatinized starch, DRILSTAR EW, Chemstar Products, co.) blends (containing from 100 to approximately 60% DMAEA.MCQ), twelve times as much active polymer must be added in the solution form to achieve the same clarity as that obtained with the dry form.

The results in Table I also reveal that the amount of cationic polymer, in either solution or dry form of the coagulant, can be replaced with up to 40% starch by weight to achieve the same level of clarity. This demonstrates a significant synergy between the starch and the cationic polymer in reducing turbidity because starch by itself is ineffective as a coagulant (see Example 2.)

EXAMPLE 2

The procedure described in Example 1 was utilized to obtain the results of Tables II, III, and IV. The dry poly (DADMAC) and poly(DADMAC)/starch combinations were derived from a solution DADMAC polymer, in the same manner as the dry DMAEA.MCQ and DMAEA.MCQ/starch polymers described in Example 1.

In the case of both poly(DADMAC) (Tables II and IV) and poly(DMAEA.MCQ) (Tables III and IV) pregelatinized starch (DRILSTAR EW, Chemstar Products, Co.) was used to displace the cationic polymer, and the turbidity values achieved with the blends containing up to 60% starch were comparable to those achieved for the cationic polymer alone. In addition, the turbidity values obtained with the cationic polymer/starch blends were significantly below those that would be expected for a direct replacement in activity between the cationic polymers and the starch—indicating a synergistic effect between the two compounds.

TABLE II

Effect of Starch on the Performance of poly(DADMAC)[1] as a Coagulant in Dry Form

| % Starch[3] | % poly(DADMAC)[1] | Turbidity (NTU) |
|---|---|---|
| 0 | 100 | 225 |
| 29.4 | 70.6 | 229 |
| 38.5 | 61.5 | 167 |
| 41 | 59 | 278 |
| 45.5 | 54.5 | 280 |
| 55.6 | 44.4 | 333 |
| 100 | 0 | 1000 |

[1]= available from Nalco Chemical Co. of Naperville, IL
[3]= DRILSTAR EW (pregelatinized corn starch) available from Chemstar Products Co. of Minneapolis, MN

TABLE III

Effect of Starch on the Performance of poly(DMAEA.MCQ)[2] as a Coagulant in Dry Form

| % Starch[3] | % poly(DMAEA.MCQ)[2] | Turbidity (NTU) |
|---|---|---|
| 0 | 100 | 35.1 |
| 29.4 | 70.6 | 25.0 |

TABLE I

Resulting Turbidity (NTU) with poly(DMAEA.MCQ)/Starch Blends Dry Products vs. 1% Solutions Treatments

| % Cationic Polymer | dry poly(DADMAC)[1] (5 ppm) | dry poly (DMAEA.MCQ)[2] Starch[3] (5 ppm) | 1% Solution poly(DMAEA.MCQ)[2] Starch[3] (5 ppm) | 1% Solution poly(DMAEA.MCQ)[2] Starch[3] (60 ppm) |
|---|---|---|---|---|
| 100 | 172 | 155 | 2700 | 101 |
| 80 | — | 201 | 2600 | 227 |
| 60 | — | 385 | 2700 | 331 |
| 40 | — | 2400 | 3200 | — |

[1]= available from Nalco Chemical Co. of Naperville, IL
[2]= available from Nalco Chemical Co. of Naperville, IL
[3]= DRILSTAR EW (pregelatinized corn starch) available from Chemstar Products Co. of Minneapolis, MN

TABLE III-continued

Effect of Starch on the Performance of poly(DMAEA.MCQ)[2]
as a Coagulant in Dry Form

| % Starch[3] | % poly(DMAEA.MCQ)[2] | Turbidity (NTU) |
|---|---|---|
| 38.5 | 61.5 | 23.0 |
| 41 | 59 | 22.5 |
| 45.5 | 54.5 | 28.0 |
| 55.6 | 44.4 | 30.5 |
| 100 | 0 | 174 |

[2]= available from Nalco Chemical Co. of Naperville, IL
[3]= DRILSTAR EW (pregelatinized corn starch) available from Chemstar Products Co. of Minneapolis, MN

TABLE IV

Resulting Turbidity (NTU) of
Cationic Polymers with Starch as Coagulants in Dry Form

| | % Cationic | Cationic Polymer Treatment | |
|---|---|---|---|
| % Starch[3] | Polymer | poly(DADMAC)[1] | poly(DMAEA.MCQ)[2] |
| 0 | 100 | 21.8 | 35.1 |
| 20 | 80 | 32.5 | 49.1 |
| 40 | 60 | 34.2 | 58.0 |
| 60 | 40 | 38.0 | 43.9 |
| 80 | 20 | 822 | 359 |
| 100 | 0 | 4930 | 4930 |

[1]= available from Nalco Chemical Co. of Naperville, IL
[2]= available from Nalco Chemical Co. of Naperville, IL
[3]= DRILSTAR EW (pregelatinized corn starch) available from Chemstar Products Co. of Minneapolis, MN

EXAMPLE 3

The procedure described in Example 1 was utilized to obtain the results of Table V. For these experiments, 500-mL cylinders were used and the starch and poly(DMAEA.MCQ) solutions were 0.2% actives. Total coagulant dosage was 24 ppm, except in the case of the poly(DMAEA.MCQ) added alone. These results demonstrate the affinity that starch and poly(DMAEA.MCQ) have for each other in solution and how the affinity can negate the synergistic effect if the starch/coagulant blend is made up and dosed as a single solution.

For example, dosing a blend of 80% poly(DMAEA.MCQ)/20% pregelatinized starch (DRILSTAR EW) gave a turbidity of almost 1200 NTU, whereas just dosing the actives equivalent of the poly(DMAEA.MCQ) (i.e. 19.2 ppm (80% of 24 ppm) gave an NTU value below 300. Adding the 19.2 ppm actives as poly(DMAEA.MCQ) and the complementary 4.8 ppm actives as starch at the same time but as separate solutions gave an NTU value slightly above 150. The turbidity values increased dramatically with a decrease in the dosage of poly(DMAEA.MCQ) by itself. This decline was definitely abated by concurrently adding a complementary amount of starch to maintain the total actives at 24 ppm.

TABLE V

Resulting Turbidity (NTU) of poly(DMAEA.MCQ) with Starch as a Coagulant in Solution Form

| | | Treatments | | |
|---|---|---|---|---|
| % Starch[3] | % Polymer | poly(DMAEA.MCQ)[2] only | poly(DMAEA.MCQ)[2] Starch[3] blend | poly(DMAEA.MCQ)[2] and Starch[3] added concurrently |
| 0 | 100 | 115 | 115 | 115 |
| 20 | 80 | 278 | 1196 | 157 |
| 40 | 60 | 1116 | 1428 | 324 |
| 60 | 40 | 1808 | — | 527 |
| 80 | 20 | — | — | 964 |
| 100 | 0 | — | — | 2058 |

[2]= available from Nalco Chemical Co. of Naperville, IL
[3]= DRILSTAR EW (pregelatinized corn starch) available from Chemstar Products Co. of Minneapolis, MN

EXAMPLE 4

The procedures described in Examples 1 and 3 were used to obtain the results in Table VI. In these experiments the solutions were added separately AND at different times. The sequence was one dosage of coagulant actives, followed by four inversions of the cylinder; the second dosage of coagulant actives, four inversions; then a single dosage of flocculant (0.2 ppm 9806 as a 0.1% solution), followed by a final four inversions, after which settling rate and turbidity were determined.

These results demonstrate the effect of split addition of starch and poly(DMAEA.MCQ) solutions as coagulants in reducing turbidity. Even when added separately, the starch and poly(DMAEA.MCQ) exhibited synergy. Adding starch as the first component followed by the addition of poly(DMAEA.MCQ) was a more effective program, overall, than adding the poly(DMAEA.MCQ) first. Once the percentage of poly(DMAEA.MCQ) was reduced to below 60% of the total actives, the turbidity from the poly(DMAEA.MCQ)-starch program rises much more rapidly than the turbidity from the starch-poly(DMAEA.MCQ) program.

TABLE VI

Resulting Turbidity (NTU) of poly(DMAEA.MCQ) with Starch as a Coagulant in Solution Form
Effect of Order of Addition and Split Addition

| | | Treatments | | | |
|---|---|---|---|---|---|
| % Starch | % Polymer | poly(DMAEA.MCQ)[2] followed by Starch[3] | Starch[3] followed by poly(DMAEA.MCQ)[2] | poly (DMAEA.MCQ)[2] Split Addition | Starch[3] Split Addition[4] |
| 0 | 100 | 195 | 195 | 195 | 1468 |
| 20 | 80 | 74.1 | 77 | 46.1 | 1680 |
| 40 | 60 | 196 | 133 | 38.7 | 1724 |
| 50 | 50 | 342 | 60.8 | 32.9 | 1820 |
| 60 | 40 | 593 | 147 | 36.7 | 1746 |
| 80 | 20 | 968 | 258 | 29.5 | 1808 |
| 100 | 0 | 1468 | 1468 | 195 | 1468 |

[2] = available from Nalco Chemical Co. of Naperville, IL
[3] = DRILSTAR EW (pregelatinized corn starch) available from Chemstar Products Co. of Minneapolis, MN
[4] = percentage in first column represents dosage added first

EXAMPLE 5

The procedure described in Example 1 was used to obtain the results in Tables VII–XIX. The results in these tables demonstrate the effect of different types of starch in the starch/poly(DMAEA.MCQ) blends on turbidity and settling rate of the slurry solids for three different samples of slurry. The different types of starch tested are defined with each table.

The synergy between starch and poly(DMAEA.MCQ) demonstrated in the previous examples is exhibited for most of the starches tested in this example. One starch that consistently performed worse than the rest was X-PAND'R which is an acid-hydrolyzed, pregelatinized amylopectin and its poor performance may be due to the combination of its low-molecular weight and high degree of branching. For each of the starches tested, an increase in starch content of the dry blend resulted in a two- to four-fold increase in settling rate obtained upon flocculation of the slurry solids. Thus, the addition of starch provides an enhancement in the activity of the acrylamide/acrylate flocculant, as well as an enhancement of the activity of the poly(DMAEA.MCQ) as a coagulant.

TABLE VII

Resulting Turbidity (NTU) of Different Starches with poly(DMAEA.MCQ) as Dry Coagulants

| | | Starch Type | | |
|---|---|---|---|---|
| % Starch | % poly(DMAEA.MCQ)[2] | Starch A[5] | Starch B[6] | Starch C[7] |
| 0 | 100 | 174 | 174 | 174 |
| 20 | 80 | 132 | 98 | 127 |
| 40 | 60 | 131 | 465 | 185 |
| 60 | 40 | 1600 | 3960 | 582 |
| 80 | 20 | 2500 | 5000 | 2730 |

[2] = available from Nalco Chemical Co. of Naperville, IL
[5] = dextran available from Sigma Chemical Co. of St. Louis, MO;
[6] = 1719 DEXTRIN (dextrin) available from Cerestar USA, Inc. of Hammond, IN
[7] = STALBY 620 (thinned, hydroxyethylated, instantized starch) available from A. E. Staley, of Decatur, IL

TABLE VIII

Effect on Turbidity of Starch Type and Polymer:Starch Ratio in a Dry Coagulant Slurry #1

| | | TURBIDITY (NTU) | | | | |
|---|---|---|---|---|---|---|
| % Starch | % Polymer | poly(DADMAC)[1] | Poly(DMAEA.MCQ)[2] | Starch D[8] | Starch E[9] | Starch F[10] |
| 0 | 100 | 43.5 | 24.7 | — | — | — |
| 20 | 80 | — | — | 51.2 | 56.3 | 34.3 |
| 40 | 60 | — | — | 32.2 | 115 | 40.3 |
| 60 | 40 | — | — | 49.6 | 129 | 44.0 |

[1] available from Nalco Chemical Co. of Naperville, IL
[2] = available from Nalco Chemical Co. of Naperville, IL
[8] = STAR-DRI 100 (maltodextrin) available from A. E. Staley (Decatur, IL)
[9] = X-PAND'R (acid hydrolyzed, pregelatinized amylopectin), available from A. E. Staley (Decatur, IL)
[10] = Pearl Starch (raw pear corn starch), available from A. E. Staley (Decatur, IL)

TABLE IX

Effect on Settling Rate of Starch Type and Polymer:Starch Ratio in a Dry Coagulant Slurry #1

| | | | Settling Rate (in/min) | | | |
|---|---|---|---|---|---|---|
| % Starch | % Polymer | poly(DADMAC)[1] | poly(DMAEA.MCQ)[2] | Starch D[8] | Starch E[9] | Starch F[10] |
| 0 | 100 | 4.9 | 3.3 | — | — | — |
| 20 | 80 | — | — | 4.3 | 4.7 | 12.0 |
| 40 | 60 | — | — | 9.7 | 10.5 | 10.2 |
| 60 | 40 | — | — | 10.0 | 14.0 | 10.2 |

[1] = available from Nalco Chemical Co. of Naperville, IL
[2] = available from Nalco Chemical Co. of Naperville, IL
[8] = STAR-DRI 100 (maltodextrin), available from A. E. Staley (Decatur, IL)
[9] = X-PAND'R (acid hydrolyzed, pregelatinized amylopectin), available from A. E. Staley (Decatur, IL)
[10] = Pearl Starch (raw pearl corn starch), available from A. E. Staley (Decatur, IL)

TABLE X

Effect on Turbidity of Starch Type and Polymer:Starch Ratio in a Dry Coagulant Slurry #1

| | | | TURBIDITY (NTU) | | | | | |
|---|---|---|---|---|---|---|---|---|
| % Starch | % Polymer | poly(DADMAC)[1] | Poly(DMAEA.MCQ)[2] | Starch G[11] | Starch H[12] | Starch I[13] | Starch J[14] | Starch K[15] |
| 0 | 100 | 29.4 | 28.8 | — | — | — | — | — |
| 20 | 80 | — | — | 34.5 | 48.8 | 56.3 | 50.6 | 33.7 |
| 40 | 60 | — | — | 35.5 | 66.5 | 61.1 | 71.2 | 68.9 |
| 60 | 40 | — | — | 42.5 | 88.7 | 67.6 | 239 | 54.5 |

[1] = available from Nalco Chemical Co. of Naperville, IL
[2] = available from Nalco Chemical Co. of Naperville, IL
[11] = MIN-STAR 2050 (industrial grade, unmodified corn starch), available from Minnesota Corn Processors of Marshall, MN
[12] = STAR*POL 410 (unmodified, pregelatinized corn starch), available from A. E. Staley of Decatur, IL
[13] = C-GEL (instant (pregelatinized) corn starch), available from Cerestar USA Inc. of Hammond, IN
[14] = STARMIC 620 (blend of 2-hydroxyethyl ether starch and 2-hydroxypropyl ether hydrogen phosphate starch), available from A. E. Staley of Decatur, IL
[15] = NADEX 772 (low MW cold-water soluble complex carbohydrate), available from National Starch of Bridgewater, NJ

TABLE XI

Effect on Settling Rate of Starch Type and Polymer:Starch Ratio in a Dry Coagulant Slurry #1

| | | | Settling Rate (in/min) | | | | | |
|---|---|---|---|---|---|---|---|---|
| % Starch | % Polymer | poly(DADMAC)[1] | Poly(DMAEA.MCQ)[2] | Starch G[11] | Starch H[12] | Starch I[13] | Starch J[14] | Starch K[15] |
| 0 | 100 | 6.3 | 3.5 | — | — | — | — | — |
| 20 | 80 | — | — | 7.0 | 5.2 | 5.5 | 3.6 | 4.0 |
| 40 | 60 | — | — | 14.0 | 5.9 | 10.2 | 9.7 | 4.3 |
| 60 | 40 | — | — | 15.2 | 16.9 | 13.1 | 11.8 | 10.5 |

[1] = available from Nalco Chemical Co. of Naperville, IL
[2] = available from Nalco Chemical Co. of Naperville, IL
[11] = MIN-STAR 2050 (industrial grade, unmodified corn starch), available from Minnesota Corn Processors of Marshall, MN
[12] = STAR*POL 410 (unmodified, pregelatinized corn starch), available from A. E. Staley of Decatur, IL
[13] = C-GEL (instant pregelatinized) corn starch), available from Cerestar USA Inc. of Hammond, IN
[14] = STARMIC 620 (blend of 2-hydroxyethyl ether starch and 2-hydroxypropyl ether hydrogen phosphate starch), available from A. E. Staley of Decatur, IL
[15] = NADEX 772 (low MW cold-water soluble complex carbohydrate), available from National Starch of Bridgewater, NJ

TABLE XII

Effect on Turbidity of Starch Type and Polymer:Starch Ratio in a Dry Coagulant Slurry #2

| % Starch | % Polymer | poly(DADMAC)[1] | Poly(DMAEA.MCQ)[2] | TURBIDITY (NTU) Starch D[8] | Starch E[9] | Starch F[10] |
|---|---|---|---|---|---|---|
| 0 | 100 | 52.1 | 54.4 | — | — | — |
| 20 | 80 | — | — | 57.6 | 76.2 | 55.3 |
| 40 | 60 | — | — | 46.3 | 241 | 64.7 |
| 60 | 40 | — | — | 69.6 | 1564 | 103 |

[1] = available from Nalco Chemical Co. of Naperville, IL
[2] = available from Nalco Chemical Co. of Naperville, IL
[8] = STAR-DRI 100 (maltodextrin) available from A. E. Staley (Decatur, IL)
[9] = X-PAND'R (acid hydrolyzed, pregelatinized amylopectin), available from A. E. Staley (Decatur, IL)
[10] = Pearl Starch (raw pear corn starch), available from A. E. Staley (Decatur, IL)

TABLE XIII

Effect on Settling Rate of Starch Type and Polymer:Starch Ratio in a Dry Coagulant Slurry #2

| % Starch | % Polymer | poly(DADMAC)[1] | poly(DMAEA.MCQ)[2] | Settling Rate (in/min) Starch D[8] | Starch E[9] | Starch F[10] |
|---|---|---|---|---|---|---|
| 0 | 100 | 10.2 | 9.2 | — | — | — |
| 20 | 80 | — | — | 16.6 | 13.1 | 10.2 |
| 40 | 60 | — | — | 25.6 | 24.0 | 21.0 |
| 60 | 40 | — | — | 27.2 | 22.8 | 23.2 |

[1] = available from Nalco Chemical Co. of Naperville, IL
[2] = available from Nalco Chemical Co. of Naperville, IL
[8] = STAR-DRI 100 (maltodextrin), available from A. E. Staley (Decatur, IL)
[9] = X-PAND'R (acid hydrolyzed, pregelatinized amylopectin), available from A. E. Staley (Decatur, IL)
[10] = Pearl Starch (raw pearl corn starch), available from A. E. Staley (Decatur, IL)

TABLE XIV

Effect on Turbidity of Starch Type and Polymer:Starch Ratio in a Dry Coagulant Slurry #2

| % Starch | % Polymer | poly(DADMAC)[1] | Poly(DMAEA.MCQ)[2] | TURBIDITY (NTU) Starch G[11] | Starch H[12] | Starch I[13] | Starch J[14] | Starch K[15] |
|---|---|---|---|---|---|---|---|---|
| 0 | 100 | 118 | 64 | — | — | — | — | — |
| 20 | 80 | — | — | 86.9 | 38.2 | 36.8 | 55.5 | 84.5 |
| 40 | 60 | — | — | 121 | 47.5 | 44.9 | 62.1 | 106 |
| 60 | 40 | — | — | 174 | 719 | 78.2 | 2472 | 89.5 |

[1] = available from Nalco Chemical Co. of Naperville, IL
[2] = available from Nalco Chemical Co. of Naperville, IL
[11] = MIN-STAR 2050 (industrial grade, unmodified corn starch), available from Minnesota Corn Processors of Marshall, MN
[12] = STAR*POL 410 (unmodified, pregelatinized corn starch), available from A. E. Staley of Decatur, IL
[13] = C-GEL (instant (pregelatinized) corn starch), available from Cerestar USA Inc. of Hammond, IN
[14] = STARMIC 620 (blend of 2-hydroxyethyl ether starch and 2-hydroxypropyl ether hydrogen phosphate starch), available from A. E. Staley of Decatur, IL
[15] = NADEX 772 (low MW cold-water soluble complex carbohydrate), available from National Starch of Bridgewater, NJ

TABLE XV

Effect on Settling Rate of Starch Type and Polymer:Starch Ratio in a Dry Coagulant Slurry #2

| | | | | Settling Rate (in/min) | | | | |
|---|---|---|---|---|---|---|---|---|
| % Starch | % Polymer | poly(DADMAC)[1] | Poly(DMAEA.MCQ)[2] | Starch G[11] | Starch H[12] | Starch I[13] | Starch J[14] | Starch K[15] |
| 0 | 100 | 22.7 | 8.4 | — | — | — | — | — |
| 20 | 80 | — | — | 24.5 | 22.7 | 27.0 | 35.5 | 24.5 |
| 40 | 60 | — | — | 24.8 | 36.0 | 32.2 | 29.8 | 24.2 |
| 60 | 40 | — | — | 28.9 | 29.1 | 33.0 | 27.9 | 26.9 |

[1]= available from Nalco Chemical Co. of Naperville, IL
[2]= available from Nalco Chemical Co. of Naperville, IL
[11]= MIN-STAR 2050 (industrial grade, unmodified corn starch), available from Minnesota Corn Processors of Marshall, MN
[12]= STAR*POL 410 (unmodified, pregelatinized corn starch), available from A. E. Staley of Decatur, IL
[13]= C-GEL (instant (pregelatinized) corn starch), available from Cerestar USA Inc. of Hammond, IN
[14]= STARMIC 620 (blend of 2-hydroxyethyl ether starch and 2-hydroxypropyl ether hydrogen phosphate starch), available from A. E. Staley of Decatur, IL
[15]= NADEX 772 (low MW cold-water soluble complex carbohydrate), available from National Starch of Bridgewater, NJ

TABLE XVI

Effect on Turbidity of Starch Type and Polymer:Starch Ratio in a Dry Coagulant Slurry #3

| | | TURBIDITY (NTU) | | | | |
|---|---|---|---|---|---|---|
| % Starch | % Polymer | poly(DADMAC)[1] | poly(DMAEA.MCQ)[2] | Starch D[8] | Starch E[9] | Starch F[10] |
| 0 | 100 | 50.1 | 55.9 | — | — | — |
| 20 | 80 | — | — | 63.7 | 57.5 | 53.7 |
| 40 | 60 | — | — | 65.8 | 122 | 64.8 |
| 60 | 40 | — | — | 79.7 | 1218 | 79.2 |

[1]= available from Nalco Chemical Co. of Naperville, IL
[2]= available from Nalco Chemical Co. of Naperville, IL
[8]= STAR-DRI 100 (maltodextrin), available from A. E. Staley (Decatur, IL)
[9]= X-PAND'R (acid hydrolyzed, pregelatinized amylopectin), available from A. E. Staley (Decatur, IL)
[10]= Pearl Starch (raw pearl corn starch), available from A. E. Staley (Decatur, IL)

TABLE XVII

Effect on Settling Rate of Starch Type and Polymer:Starch Ratio in a Dry Coagulant Slurry #3

| | | Settling Rate (in/min) | | | | |
|---|---|---|---|---|---|---|
| % Starch | % Polymer | poly(DADMAC)[1] | poly(DMAEA.MCQ)[2] | Starch D[8] | Starch E[9] | Starch F[10] |
| 0 | 100 | 5.9 | 4.5 | — | — | — |
| 20 | 80 | — | — | 4.7 | 4.3 | 12.0 |
| 40 | 60 | — | — | 14.0 | 15.0 | 13.2 |
| 60 | 40 | — | — | 15.8 | 16.6 | 15.8 |

[1]= available from Nalco Chemical Co. of Naperville, IL
[2]= available from Nalco Chemical Co. of Naperville, IL
[8]= STAR-DRI 100 (maltodextrin), available from A. E. Staley (Decatur, IL)
[9]= X-PAND'R (acid hydrolyzed, pregelatinized amylopectin), available from A. E. Staley (Decatur, IL)
[10]= Pearl Starch (raw pearl corn starch), available from A. E. Staley (Decatur, IL)

TABLE XVIII

Effect on Turbidity of Starch Type and Polymer:Starch Ratio in a Dry Coagulant Slurry #3

| | | | | TURBIDITY (NTU) | | | | |
|---|---|---|---|---|---|---|---|---|
| % Starch | % Polymer | poly(DADMAC)[1] | Poly(DMAEA.MCQ)[2] | Starch G[11] | Starch H[12] | Starch I[13] | Starch J[14] | Starch K[15] |
| 0 | 100 | 48.3 | 60.3 | — | — | — | — | — |
| 20 | 80 | — | — | 43.3 | 56.1 | 56.6 | 70.1 | 45.4 |
| 40 | 60 | — | — | 72.5 | 84.7 | 73.4 | 108 | 115 |
| 60 | 40 | — | — | 76.2 | 237 | 97.9 | 691 | 104 |

[1]= available from Nalco Chemical Co. of Naperville, IL
[2]= available from Nalco Chemical Co. of Naperville, IL
[11]= MIN-STAR 2050 (industrial grade, unmodified corn starch), available from Minnesota Corn Processors of Marshall, MN
[12]= STAR*POL 410 (unmodified, pregelatinized corn starch), available from A. E. Staley of Decatur, IL
[13]= C-GEL (instant (pregelatinized) corn starch), available from Cerestar USA Inc. of Hammond, IN
[14]= STARMIC 620 (blend of 2-hydroxyethyl ether starch and 2-hydroxypropyl ether hydrogen phosphate starch), available from A. E. Staley of Decatur, IL
[15]= NADEX 772 (low MW cold-water soluble complex carbohydrate), available from National Starch of Bridgewater, NJ

TABLE XIX

Effect on Settling Rate of Starch Type and Polymer:Starch Ratio in a Dry Coagulant Slurry #3

| | | | | Settling Rate (in/min) | | | | |
|---|---|---|---|---|---|---|---|---|
| % Starch | % Polymer | poly(DADMAC)[1] | Poly(DMAEA.MCQ)[2] | Starch G[11] | Starch H[12] | Starch I[13] | Starch J[14] | Starch K[15] |
| 0 | 100 | 4.4 | 3.9 | — | — | — | — | — |
| 20 | 80 | — | — | 3.7 | 3.2 | 6.3 | 3.8 | 4.7 |
| 40 | 60 | — | — | 12.7 | 6.1 | 9.1 | 11.5 | 16.8 |
| 60 | 40 | — | — | 12.0 | 14.3 | 12.5 | 15.9 | 16.0 |

[1]= available from Nalco Chemical Co. of Naperville, IL
[2]= available from Nalco Chemical Co. of Naperville, IL
[11]= MIN-STAR 2050 (industrial grade, unmodified corn starch), available from Minnesota Corn Processors of Marshall, MN
[12]= STAR*POL 410 (unmodified, pregelatinized corn starch), available from A. E. Staley of Decatur, IL
[13]= C-GEL (instant (pregelatinized) corn starch), available from Cerestar USA Inc. of Hammond, IN
[14]= STARMIC 620 (blend of 2-hydroxyethyl ether starch and 2-hydroxypropyl ether hydrogen phosphate starch), available from A. E. Staley of Decatur, IL
[15]= NADEX 772 (low MW cold-water soluble complex carbohydrate), available from National Starch of Bridgewater, NJ

EXAMPLE 6

Following the procedures outlined in Examples 1 and 3, and from the data put forth in Example 5, it is expected that adding dry cationic polymer and dry starch separately to the slurry system would also be an effective means to reduce turbidity. It would be expected that, as dry material, the amount polymer actives would be less than that required for the same products in solution form to achieve the same level of turbidity, per Example 1. It is also expected that adding the two products separately in dry form would exhibit the same synergistic effect as that produced with the solutions.

EXAMPLE 7

A gravity dewatering test could be used to evaluate the efficacy of starch/cationic polymer blends for twin belt press dewatering. It is expected that starch and cationic polymers used as solutions would be particularly effective and demonstrate similar synergy in this application. The use of a starch/cationic polymer blend could also be effective in this application. However, in the case of a dry product, it is anticipated that the cationic polymer would need to be of a low enough molecular weight and/or the dry polymer blend would need to be of a small enough particle size so as to have the coagulant dissolve rapidly enough in the slurry system. This needs to be the case as the residence time of the coagulant in the slurry system (i.e. the time between the point of addition and entry into the apparatus) is much shorter for a twin belt press than for a gravity separation thickener.

EXAMPLE 8

Using the same cylinder settling test and polymer preparation procedure outlined in Examples 1 and 3, it is expected that the starch/cationic polymer coagulant system, both as solutions and dry product would be equally applicable, with similar anticipated results, for the settling and clarification of other mineral slurries besides coal refuse. The slurries would be of similar solids concentration and size consist as the coal refuse slurry referred to in the other examples presented here. These slurry systems could include, but would be limited to, kaolin, sand and gravel, calcium phosphate dewatering, ores from precious metal processing, and iron ore.

EXAMPLE 9

The procedure described in Example 1 was utilized to obtain the results in Table XX. In this case, an unmodified industrial-grade potato starch (A. E. Staley Mfg. Co., Decatur, Ill.) was used to displace the cationic polymer, and the turbidity values achieved with the blends containing up to 40% starch were comparable to those achieved for the cationic polymer alone. In addition, the turbidity values obtained with the cationic polymer/starch blends were significantly below those that would be expected for a direct in activity between the cationic polymers and the starch—indicating a synergistic effect between the two compounds.

TABLE XX

| % p-DMAEA.MCQ | % Starch | Turbidity (NTU) | Settling Rate (in/min) |
| --- | --- | --- | --- |
| 100 | 0 | 42 | 6.6 |
| 99 | 1 | 38 | 7 |
| 90 | 10 | 36.2 | 6.6 |
| 80 | 20 | 53.3 | 7.2 |
| 60 | 40 | 70.2 | 12.9 |
| 40 | 60 | 133 | 12.8 |
| 20 | 80 | 314 | 15.6 |
| 0 | 100 | 456 | 10.4 |

EXAMPLE 10

For a lab-scale reaction, a 40% actives aqueous solution of a low molecular weight DMAEM.MCQ polymer was prepared in a 1.5-L batch reactor with a stirrer, thermocouple, reflux condenser, and nitrogen purge. 533.3 g (53.33 wt %) of DMAEM.MCQ (available from CPS Chemical Co. of West Memphis, Ark.) monomer (as a 75% solution in water) were dissolved in 462.17 g of deionized water (46.22 wt %) along with 0.5 g (0.05 wt %) sodium hypophosphite to control the molecular weight of the polymer and mixed in the reactor. The solution was purged with $N_2$ and warmed to 40° C. over 30 minutes. At that time, 4.00 g of a V-50 solution (2,2'-azobisisobutyronitrile available from DuPont Specialty Chemicals, Inc. of Wilmington, Del.) (10% in water), was added to initiate the polymerization. The polymerization began within 3–10 minutes. No attempt was made to cool the reaction. After the reaction reached its maximum temperature, ~78° C., it was held at that temperature for 30 minutes. The reactor was cooled to room temperature and the contents were transferred to a container for evaluation. The product was characterized by measurement of an intrinsic viscosity (IV) (1.25 M $NaNO_3$ solution, 1wt % polymer solutions), colloidal titration (0.0025 g product against 0.0002 N potassium salt of polyvinyl sulfuric acid (PVSK)), and residual monomer concentration. The polymer samples used for the experiments were from a 100-gallon direct scale-up of the aforementioned reaction.

The procedure described in Example 1 was utilized to obtain the results in Tables XXI and XXII. The dry p-DMAEM.MCQ and p-DMAEM.MCQ/starch combinations were derived from a solution DMAEM.MCQ polymer, in the same manner as the dry polymer samples described in Example 1. In both cases (Tables XXI and XXII), an unmodified industrial-grade potato starch (A. E. Staley Mfg. Co., Decatur, Ill.) was used to displace the cationic polymer, and the turbidity values achieved with the blends containing up to 40% starch were comparable to those achieved for the cationic polymer alone. In addition, the turbidity values obtained with the cationic polymer/starch blends were significantly below those that would be expected for a direct replacement in activity between the cationic polymers and the starch—indicating a synergistic effect between the two compounds.

TABLE XXI

Slurry A

| % p-DMAEA.MCQ | % Starch | Turbidity (NTU) | Settling Rate (in/min) |
| --- | --- | --- | --- |
| 100 | 0 | 84.1 | 11.6 |
| 99 | 1 | 93.5 | 12 |
| 90 | 10 | 90.1 | 12.8 |
| 80 | 20 | 88.6 | 12.2 |
| 60 | 40 | 99.5 | 14 |
| 40 | 60 | 177 | 16.8 |
| 20 | 80 | 197 | 25.1 |
| 0 | 100 | 341 | 23.4 |

TABLE XXII

Slurry B

| % p-DMAEA.MCQ | % Starch | Turbidity (NTU) | Settling Rate (in/min) |
| --- | --- | --- | --- |
| 100 | 0 | 30.2 | 4.3 |
| 99 | 1 | 33.8 | 4.2 |
| 90 | 10 | 39.8 | 6 |
| 80 | 20 | 50.2 | 6.7 |
| 60 | 40 | 57 | 9.1 |
| 40 | 60 | 82.3 | 13.6 |
| 20 | 80 | 166 | 13.6 |
| 0 | 100 | 319 | 10.5 |

Changes can be made in the composition, operation and arrangement of the method of the present invention described herein without departing from the concept and scope of the invention as defined in the following claims:

We claim:

1. A method for dewatering coal tailings containing water, said method comprising the steps of:
   a. feeding said coal tailings to a thickener;
   b. contacting said coal tailings with an effective coagulating amount of a coagulant comprising a combination of a cationic polymer and a starch to reduce turbidity in said water, wherein said cationic polymer is formed from polymerization of one or more monomers selected from the group consisting of dimethylaminoethylacrylate methyl chloride quaternary salt, dimethylaminoethylacrylate benzyl chloride quaternary salt, dimethylaminoethylmethacrylate methyl chloride quaternary salt, dimethylaminoethylmethacrylate benzyl chloride quaternary salt, diallyldimethylammonium chloride and combinations thereof, and wherein the weight ratio of cationic polymer to starch in said combination is from about 99:1 to about 20:80;
   c. allowing said coal tailings to settle to the bottom of the thickener to obtain concentrated coal tailings;

d. discharging said concentrated tailings from said thickener; and e. withdrawing clarified liquid from said thickener.

2. The method according to claim 1 further comprising the addition of a flocculant.

3. The method according to claim 2 wherein said flocculant is a copolymer of acrylamide and acrylic acid.

4. The method of claim 1 wherein the thickener is a gravity sedimentation device.

5. The method of claim 1 wherein said polymer is a dry polymer.

6. The method of claim 1 wherein said polymer is a solution polymer.

7. The method of claim 1 wherein said starch is selected from the group consisting of unmodified starch, pregelatinized starch, hydrolyzed starch and combinations thereof.

8. The method of claim 1 wherein said combination is at least 30 weight percent starch.

9. The method of claim 1 wherein said polymer is poly(dimethylaminoethylacrylate methyl chloride quaternary salt) and said starch is unmodified starch.

10. The method of claim 9 wherein the ratio of polymer to starch in said combination is from about 70:30 to about 20:80.

11. The method of claim 9 wherein the ratio of polymer to starch in said combination is from about 60:40 to about 25:75.

12. A method for dewatering a clean coal product containing water comprising the steps of:

a. feeding a clean coal product containing water to a mechanical filtering device;

b. contacting said clean coal product with an effective coagulating amount of a coagulant comprising a combination of a cationic polymer and a starch to reduce turbidity in said water, wherein said cationic polymer is formed from polymerization of one or more monomers selected from the group consisting of dimethylaminoethylacrylate methyl chloride quaternary salt, dimethylaminoethylacrylate benzyl chloride quaternary salt, dimethylaminoethylmethacrylate methyl chloride quaternary salt, dimethylaminoethylmethacrylate benzyl chloride quaternary salt, diallyldimethylammonium chloride and combinations thereof, and wherein the weight ratio of cationic polymer to starch in said combination is from about 99:1 to about 20:80;

c. removing water from said clean coal product; and then, d. recovering a dewatered clean coal product from the mechanical filtering device.

13. The method according to claim 12 further comprising the addition of a flocculent.

14. The method according to claim 13 wherein said flocculant is a copolymer of acrylamide and acrylic acid.

15. The method of claim 12 wherein said polymer is a dry polymer.

16. The method of claim 12 wherein said polymer is a solution polymer.

17. The method of claim 12 wherein said starch is selected from the group consisting of unmodified starch, pregelatinized starch, hydrolyzed starch and combinations thereof.

18. The method of claim 12 wherein said combination is at least 30 weight percent starch.

19. The method of claim 12 wherein said polymer is poly(dimethylaminoethylacrylate methyl chloride quaternary salt) and said starch is unmodified starch.

20. The method of claim 19 wherein the ratio of polymer to starch in said combination is from about 70:30 to about 20:80.

21. The method of claim 19 wherein the ratio of polymer to starch in said combination is from about 60:40 to about 25:75.

22. The method of claim 12 wherein said mechanical filtering device is selected from the group consisting of gravity thickeners, twin belt presses and rotary drum filters.

23. A method for dewatering mineral slurries containing water comprising the steps of:

a. feeding the mineral slurry into a thickener;

b. treating said mineral slurry with an effective coagulating amount of a coagulant comprising a combination of a cationic polymer and a starch to reduce turbidity in said water, wherein said cationic polymer is formed from polymerization of one or more monomers selected from the group consisting of dimethylaminoethylacrylate methyl chloride quaternary salt, dimethylaminoethylacrylate benzyl chloride quaternary salt, dimethylaminoethylmethacrylate methyl chloride quaternary salt, dimethylaminoethylmethacrylate benzyl chloride quaternary salt, diallyldimethylammonium chloride and combinations thereof, and wherein the weight ratio of cationic polymer to starch in said combination is from about 99:1 to about 20:80;

c. allowing the water to separate from the mineral slurry;

d. withdrawing water from said thickener; and e. discharging the dewatered mineral products from said thickener.

24. The method of claim 23 wherein the mineral slurry is selected from the group consisting of: titania, copper, trona, beryllium and taconite slurries.

25. The method of claim 23 further comprising the addition of a flocculant.

26. The method of claim 25 wherein said flocculent is a copolymer of acrylamide and acrylic acid.

27. The method of claim 23 wherein said polymer is a dry polymer.

28. The method of claim 23 wherein said polymer is a solution polymer.

29. The method of claim 23 wherein said starch is selected from the group consisting of unmodified starch, pregelatinized starch, hydrolyzed starch and combinations thereof.

30. The method of claim 23 wherein said combination is at least 30 weight percent starch.

31. The method of claim 23 wherein said polymer is poly(dimethylaminoethylacrylate methyl chloride quaternary salt) and said starch is unmodified starch.

32. The method of claim 31 wherein the ratio of polymer to starch in said combination is from about 70:30 to about 20:80.

33. The method of claim 31 wherein the ratio of polymer to starch in said combination is from about 60:40 to about 25:75.

34. A method for clarifying the water contained in a coal refuse slurry, said method comprising the steps of:

a. treating the coal refuse slurry with an effective coagulating amount of a coagulant comprising a combination of a cationic polymer and a starch to reduce turbidity in said water, wherein said cationic polymer is formed from polymerization of one or more monomers selected from the group consisting of dimethylaminoethylacrylate methyl chloride quaternary salt, dimethylaminoethylacrylate benzyl chloride quaternary salt, dimethylaminoethylmethacrylate methyl chloride quaternary salt, dimethylaminoethylmethacrylate benzyl chloride quaternary salt, diallyldimethylammonium chloride and combinations thereof, and wherein the weight ratio of cationic polymer to starch in said combination is from about 99:1 to about 20:80;

b. allowing the water to separate from the coal refuse;

c. feeding the separated water and coal refuse into a twin belt filter press;

d. withdrawing the clarified water through the twin belt filter press; and f. removing the coal refuse from the twin belt filter press.

35. The method according to claim 34 further comprising the addition of a flocculant.

36. The method according to claim 34 wherein said flocculant is a copolymer of acrylamide and acrylic acid.

37. The method of claim 34 wherein said polymer is a dry polymer.

38. The method of claim 34 wherein said polymer is a solution polymer.

39. The method of claim 34 wherein said starch is selected from the group consisting of unmodified starch, pregelatinized starch, hydrolyzed starch and combinations thereof.

40. The method of claim 34 wherein said combination is at least 30 weight percent starch.

41. The method of claim 34 wherein said polymer is poly(dimethylaminoethylacrylate methyl chloride quaternary salt) and said starch is unmodified.

42. The method of claim 41 wherein the ratio of polymer to starch in said combination is from about 70:30 to about 20:80.

43. The method of claim 41 wherein the ratio of polymer to starch in said combination is from about 60:40 to about 25:75.

* * * * *